May 21, 1935. A. C. HEISE ET AL 2,001,842
TEETHING AND FEEDING NIPPLE
Filed May 21, 1934
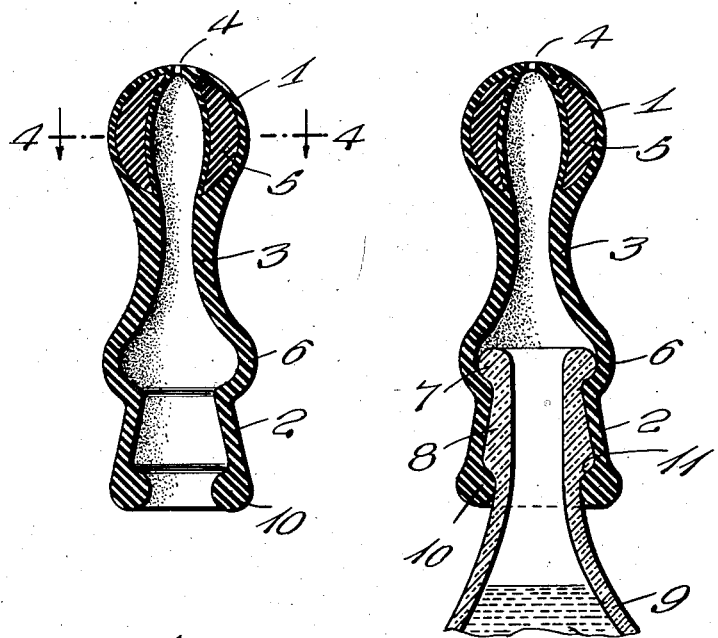
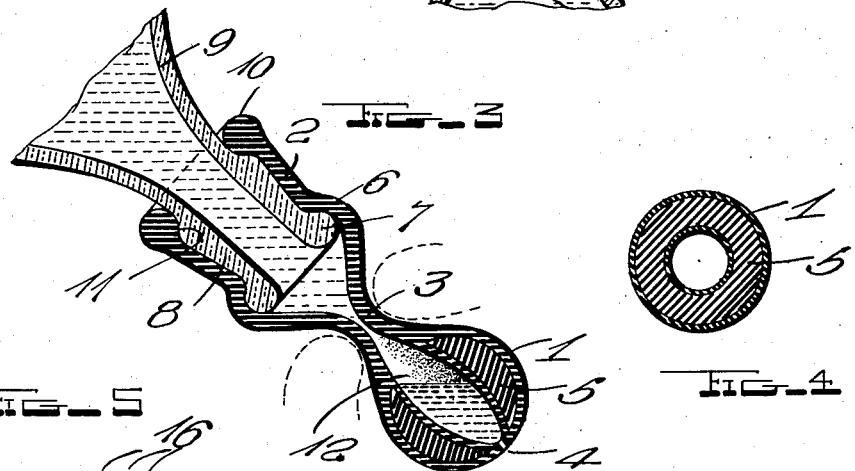
Inventors
Arthur C. Heise,
Millard W. Jacobi,
BY
ATTORNEYS.

Patented May 21, 1935

2,001,842

UNITED STATES PATENT OFFICE 2,001,842

TEETHING AND FEEDING NIPPLE

Arthur C. Heise and Millard W. Jacobi, Baltimore, Md.

Application May 21, 1934, Serial No. 726,838

2 Claims. (Cl. 128—252)

This invention relates to nipples and one object of the invention is to provide a device of this character of such construction that it may serve both as a feeding nipple and as a teething device.

Another object of the invention is to provide the nipple with a reinforced outer end portion of such construction that it serves very effectively as a teething device and also as a reservoir for a measured quantity of milk when a baby is feeding from a bottle.

A still further object of the invention is to provide a nipple of such construction that during feeding, pressure of the lips will cause the nipple to be constricted inwardly of its reinforced outer end portion as suction is applied, thereby restricting flow of additional milk into the chamber formed by the reinforced outer end portion of the nipple and preventing more than a certain quantity of milk being sucked into the baby's mouth at one time. This prevents too rapid feeding and also prevents danger of colic due to a large quantity of milk being consumed in a short length of time.

Another object of the invention is to so construct the nipple that when it is in use, it cannot collapse due to the formation of a partial vacuum in the bottle and prevent flow of milk through the nipple.

A still further object of the invention is to provide a nipple having its inner end portion of such construction that it will firmly grip the neck of a bottle and not be liable to work loose or be pulled off by a baby.

Still another object of the invention resides in providing a nipple which is simple and durable in construction, inexpensive to manufacture and one which will be very efficient in application to use.

With these and numerous other objects in view, our invention consists in the novel features of construction, combination and arrangement of parts as will be hereinafter referred to and more particularly pointed out in the specification and claims.

In the accompanying drawing forming a part of this application;

Figure 1 is a sectional view taken longitudinally through the nipple;

Figure 2 is a longitudinal sectional view showing the nipple applied to a bottle;

Figure 3 is a view similar to Figure 2 showing the bottle tilted as in use and the nipple constricted during a sucking operation;

Figure 4 is a section taken transversely through the nipple along the line 4—4 of Figure 1; and Figure 5 is a longitudinal sectional view illustrating a modified construction.

This improved nipple is formed of rubber and has a body consisting of an outer end portion 1, an inner end portion 2 and a throat or intermediate portion 3 uniting the inner and outer end portions. The body is of soft rubber of sufficient thickness to normally retain the shape disclosed in Figure 1 and its outer end 1 which is formed with an outlet opening 4 at its center, is substantially spherical in shape and molded about a reinforcement 5 formed of tough resilient rubber. The solid reinforcement is entirely embedded in walls of the outer end portion or head of the nipple and it should be noted that its walls are crescent shaped in longitudinal section as shown in Figures 1, 2 and 3. By this arrangement, the head will have a soft outer surface so that it will not hurt a baby's tender gums but at the same time the head will have sufficient resiliency and toughness to permit it to be used as a teething device.

The walls of the body gradually lessen in thickness from the head 1 towards the inner end of the neck 3 which is flared and then constricted to form a channel 6 to engage about the bead 7 of the neck 8 of a bottle 9 and the neck 2 or inner end portion of the nipple increases in diameter towards its rear end and terminates in an inwardly projecting circumferential bead 10 which fits tightly about the bottle neck under the shoulder 11. It will thus be seen that the inner end portion of the neck 2 of the nipple will have tight fitting engagement about the neck of a bottle and since the bead 10 engages under the shoulder 11 and the bead 7 of the bottle is received in the channel 6, there will be no danger of the nipple working off of the bottle and also a baby will not be able to pull the nipple from the bottle.

Referring to Figures 1 and 2, it will be seen that when this nipple is in its normal condition and applied to a bottle, milk can flow freely from the bottle through the neck 3 into the head or front end 1 and fill the interior of the nipple. When the bottle is in use it is tilted in an inverted position as shown in Figure 3 and the head of the nipple placed in the baby's mouth with the neck disposed between the lips indicated by dotted lines in this view. In drinking from the bottle, the baby sucks upon the nipple and pressure of the lips will cause the neck 3 to be constricted, thereby entirely or almost entirely closing the nipple intermediate the length of the neck and effectively preventing flow of milk from the bottle into the chamber 12, thus formed in the interior of the head. The pressure and suction causes milk in this chamber to pass out through the discharge opening 4 and since flow of additional milk into the chamber is prevented as long as the neck is constricted, only a predetermined quantity of milk corresponding to the capacity of the chamber 12 can be consumed during one sucking operation. When pressure upon the neck is relieved during intervals between sucking, milk will again flow into the chamber to fill the same and during each sucking operation, the chamber will be emptied. It will thus be seen that too rapid feeding will be prevented and as the baby cannot gulp its milk, likelihood of colic will be eliminated.

The reinforcement 5 serves to quickly distend the nipple to its normal dimensions between sucking operations and it also serves to prevent collapsing of the nipple by action of a partial vacuum forming in the bottle when the milk is partially consumed. A bottle having one of the improved nipples applied thereto can be given to a baby during the night and will last such a length of time that only one night feeding will be necessary. When a baby is cutting teeth the nipple can be used as a teething device as the reinforcement is sufficiently tough and resilient to permit the head to be chewed upon without losing its spherical shape. It should be further noted that when the nipple is to be washed, the head can be readily grasped in one hand and the throat and neck or rear end portion turned forwardly over the head to such a position that the inner and outer surfaces of the nipple can be thoroughly cleansed.

In Figure 5, there has been disclosed a modified embodiment of the invention. Referring to this figure, it will be seen that the head 13 is formed entirely of soft rubber instead of having a tough resilient core embedded therein. The dimensions and shape are substantially the same as shown in Figures 1, 2 and 3 so that the neck 14 and inner end portion of the head may be constricted to confine milk in the chamber 15 and force a measured quantity of milk to be ejected during each sucking operation. It should also be noted that in this form of the invention a plurality of outlet openings 16 are provided instead of a single outlet. This nipple serves very effectively as a feeding nipple and to a certain extent as a teething device as the walls of the head are thick enough to normally retain the head in spherical shape and a baby can chew upon the head without unduly collapsing the head.

From the foregoing description of the construction of our improved nipple, the application of the same to use will be readily understood. It will be seen that we have provided a simple, inexpensive and efficient means for carrying out the objects of the invention and while we have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. A nipple comprising a body of soft rubber having its rear portion adapted for application to a bottle and having its forward portion enlarged to form a substantially spherical head merging into a reduced intermediate portion, an outlet opening being formed centrally of the outer end of the nipple, and a reinforcement of tough resilient rubber embedded in walls of the head, said reinforcement being substantially spherical in shape and extending the entire circumference of the head and longitudinally thereof for substantially the entire depth of the head but terminating in radial spaced relation to the outlet opening and in spaced relation to the reduced neck whereby the neck portion of the nipple may be constricted.

2. A nipple comprising a body of soft rubber open at its rear and formed with a bottle engaging rear portion, a substantially spherical forward portion constituting a head and a reduced intermediate portion between the head and rear portion, walls of the intermediate portion gradually increasing in thickness towards the head and merging into the head and the head being formed with a centrally located discharge opening at its outer end and having forward portions of its walls gradually decreased in thickness towards the discharge opening, and a reinforcement of tough resilient rubber substantially spherical in shape, said reinforcement being entirely embedded in walls of the head for the entire circumference thereof and extending longitudinally of the head for substantially the entire length thereof, walls of the reinforcement being substantially crescent-shaped in longitudinal section and gradually decreased in thickness towards inner and outer ends of the head with their outer ends terminating in radial spaced relation to the discharge opening.

ARTHUR C. HEISE.
MILLARD W. JACOBI.